US011386202B2

(12) United States Patent
Sutton et al.

(10) Patent No.: US 11,386,202 B2
(45) Date of Patent: Jul. 12, 2022

(54) APPARATUS AND METHOD FOR SOCIAL ACCOUNT ACCESS CONTROL

(71) Applicant: Proofpoint, Inc., Sunnyvale, CA (US)

(72) Inventors: Richard Banks Sutton, Poway, CA (US); Anthony Lawrence Dorie, San Francisco, CA (US); Michael Bixby Villa, San Mateo, CA (US); Wenchang Yan, Burlingame, CA (US); Devon Hugh Redmond, Encinitas, CA (US); Raymond Kruck, Burlingame, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 0 days.

(21) Appl. No.: 13/672,635

(22) Filed: Nov. 8, 2012

(65) Prior Publication Data

US 2014/0129632 A1 May 8, 2014

(51) Int. Cl.
*G06F 21/55* (2013.01)
*G06Q 50/00* (2012.01)

(52) U.S. Cl.
CPC ........... *G06F 21/552* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,176,158 | B2* | 5/2012 | DiFalco | H04L 63/20 709/223 |
| 9,069,885 | B1* | 6/2015 | Moeller | G06F 11/1448 |
| 2003/0071715 | A1* | 4/2003 | Lavelle | G07C 9/00103 340/5.5 |
| 2004/0259633 | A1* | 12/2004 | Gentles | G07F 17/32 463/29 |
| 2006/0092948 | A1* | 5/2006 | Katz et al. | 370/395.52 |
| 2006/0123083 | A1* | 6/2006 | Goutte | G06Q 10/107 709/206 |
| 2006/0143447 | A1* | 6/2006 | Vasishth | H04L 63/102 713/166 |
| 2007/0088669 | A1* | 4/2007 | Jaschek | G06F 16/172 |
| 2009/0319559 | A1* | 12/2009 | Westerfeld | G06Q 10/10 |
| 2010/0058462 | A1* | 3/2010 | Chow | A61N 1/37247 726/17 |
| 2011/0035789 | A1 | 2/2011 | Callahan et al. | |
| 2011/0191693 | A1* | 8/2011 | Baggett | G06F 16/35 715/752 |

(Continued)

OTHER PUBLICATIONS

International Search Report and Written Opinion issued to International Patent Application No. PCT/US13/69109, dated Apr. 4, 2014, 7 pgs.

*Primary Examiner* — Tonia L Dollinger
*Assistant Examiner* — Joseph M Cousins
(74) *Attorney, Agent, or Firm* — Sprinkle IP Law Group

(57) ABSTRACT

A computer implemented method includes monitoring changes to an account accessible by a group of subscribers that form a social network. The changes to the account are compared to a normative base line to identify deviations from the normative base line. An alert is sent in response to deviations from the normative base line. The normative base line is defined by metadata gathered through an application program interface associated with the account, account entity data and a set of predefined rules.

20 Claims, 8 Drawing Sheets

(56) References Cited

U.S. PATENT DOCUMENTS

| | | | |
|---|---|---|---|
| 2011/0231296 A1* | 9/2011 | Gross | G06Q 10/10 705/37 |
| 2011/0258258 A1* | 10/2011 | Briere | G06Q 10/10 709/205 |
| 2011/0282943 A1* | 11/2011 | Anderson et al. | 709/204 |
| 2011/0296003 A1* | 12/2011 | McCann et al. | 709/224 |
| 2012/0166349 A1* | 6/2012 | Dedis et al. | 705/319 |
| 2012/0166553 A1* | 6/2012 | Rubinstein et al. | 709/206 |
| 2012/0260339 A1* | 10/2012 | Bhogal et al. | 726/23 |
| 2012/0297477 A1* | 11/2012 | Raviv | 726/22 |
| 2012/0297484 A1* | 11/2012 | Srivastava | G06F 21/552 726/23 |
| 2013/0104203 A1* | 4/2013 | Davis | H04L 9/3231 726/5 |
| 2013/0290437 A1* | 10/2013 | Saib | G06Q 10/10 709/206 |
| 2013/0339186 A1* | 12/2013 | French et al. | 705/26.35 |
| 2013/0340089 A1* | 12/2013 | Steinberg | H04L 63/10 726/27 |
| 2014/0082169 A1* | 3/2014 | Shinde | H04N 21/25883 709/223 |
| 2014/0096035 A1* | 4/2014 | Hall et al. | 715/753 |
| 2014/0280570 A1* | 9/2014 | Sutton et al. | 709/204 |

* cited by examiner

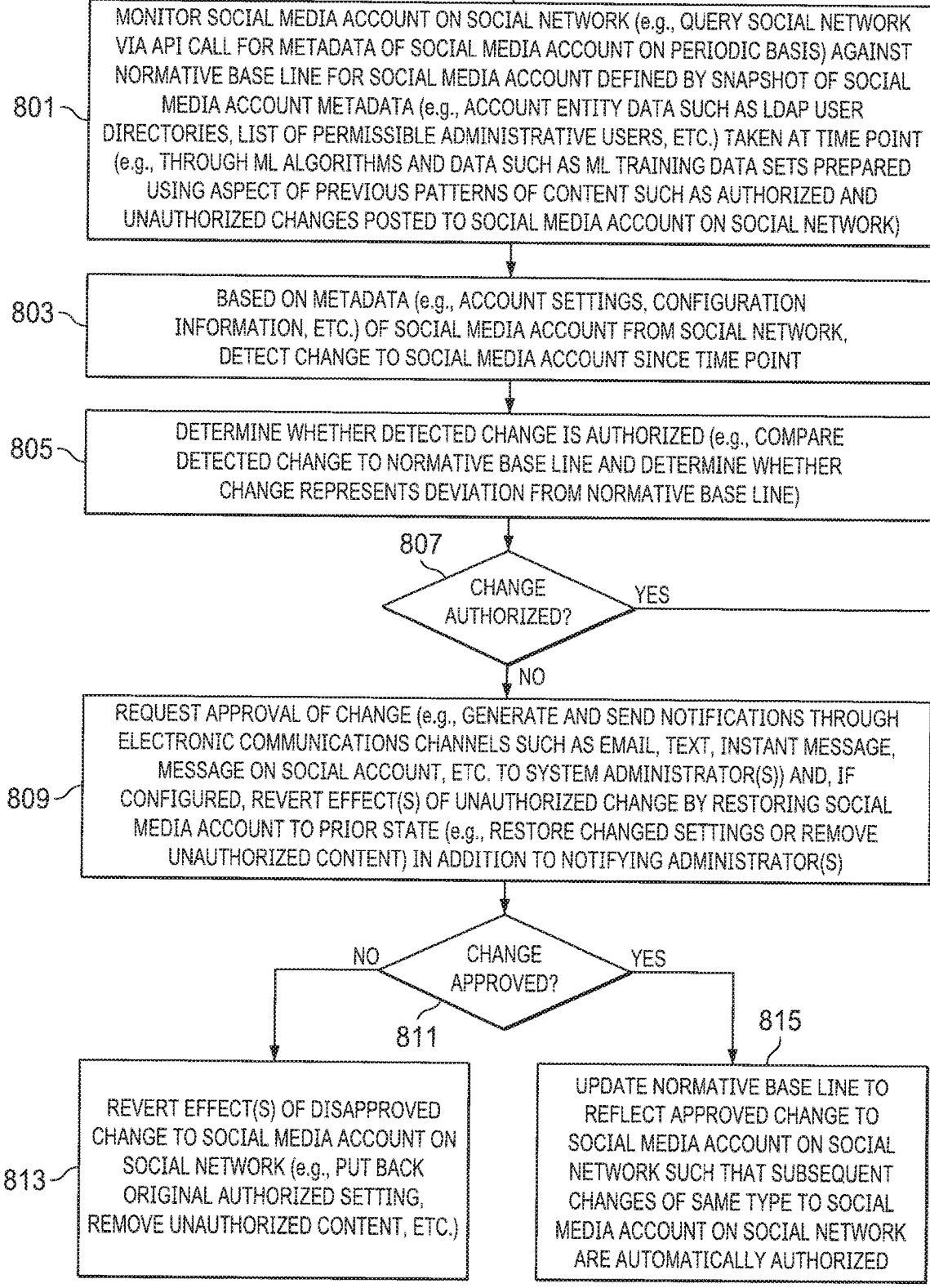

APPARATUS AND METHOD FOR SOCIAL ACCOUNT ACCESS CONTROL

FIELD OF THE INVENTION

This invention relates generally to access control in computer networks. More particularly, this invention relates to techniques for social account access control.

BACKGROUND

A social networking service is an online service, platform, or site that focuses on facilitating the building of social networks or social relations among people who, for example, share interests, activities, backgrounds, or real-life connections. Social networking services, platforms and sites include Facebook®, Google+®, LinkedIn®, Twitter®, YouTube®, Xing®, and many others, collectively constituting over a billion users. They have become so pervasive that they are commonly used by organizations to advertise and otherwise communicate with their target audiences.

A social account is a communication portal on a social networking platform. An account can be owned by an individual or it can be owned by an employee of a company for the sole purpose of broadcasting information about the company or its products. Creating accounts on these social networks is relatively simple and allows individual users to create presences on those social networks for the organization's products, brands and initiatives. At the same time, granting additional individuals and other applications administrative access to a social account or multiple social accounts is also simple and very common. These social accounts and the activities on them become very valuable forums for communicating directly with key audiences of the organization from employees and potential employees to influencers, prospective customers, and actual customers of the organization. Ensuring the integrity of the accounts is as important as protecting the integrity of content published on an organization's website.

The social networking platforms themselves provide basic means to ensure that only authorized users can modify the settings and content on specific accounts, typically through simple passwords. However, as with any system that relies on a user to provide a password for authentication, unauthorized access can be gained by an individual by stealing that password through any of a multitude of well-known means: stealing the password by hacking the social network itself, phishing, malware, social engineering, shoulder surfing, etc. Once an unauthorized individual has password access, he can publish unauthorized content that might defame the organization or harass its users, revoke access for other authorized users, or even delete the account.

Further, unauthorized changes can also be made as a result of mistakes and poor coordination by authorized users across multiple social networks and via direct account access and via third party applications authorized on a particular social account or set of social accounts. This occurs where authorization is formalized as part of a written policy that doesn't provide granular access policies to meet the requirements of the organization across multiple accounts. For example, a platform like Facebook® makes it very easy to add additional users as administrators to page accounts in a way that makes it easy to contravene standards that may be set by an organization around administrative access. This adds to the risk and likelihood of accounts being inappropriately changed. For example, FIG. 1 shows how in Facebook a page administrator can simply select from a list of people who 'Like' that page and add them as an Admin for that account. This is regardless of their affiliation with the owner of the page. This is a prime example of how and why it is difficult for organizations to maintain the integrity of management over their social accounts.

Thus, there is a need to detect and prevent unauthorized changes to social accounts, notify proper authorities when changes occur, prevent them where possible, and mitigate the effects by removing content or reinstating settings.

SUMMARY OF THE INVENTION

A computer implemented method includes monitoring changes to an account accessible by a group of subscribers that form a social network. The changes to the account are compared to a normative base line to identify deviations from the normative base line. An alert is sent in response to deviations from the normative base line. The normative base line is defined by metadata gathered through an application programming interface associated with the account on the social network platform, account entity data, and a set of predefined rules.

BRIEF DESCRIPTION OF THE FIGURES

The invention is more fully appreciated in connection with the following detailed description taken in conjunction with the accompanying drawings, in which:

FIG. 8 is a flowchart showing example details of the monitoring process of FIGS. 4-7 according to some embodiments of the invention.

Like reference numerals refer to corresponding parts throughout the several views of the drawings.

DETAILED DESCRIPTION

The invention provides techniques for authorized users of a social account to protect it from modifications by unauthorized individuals and to protect it from unintentional modifications by authorized users. The invention does this by first building a set of data that represents authorized and unauthorized changes to a social account. The set of data constitutes a normative base line.

Figure 1:
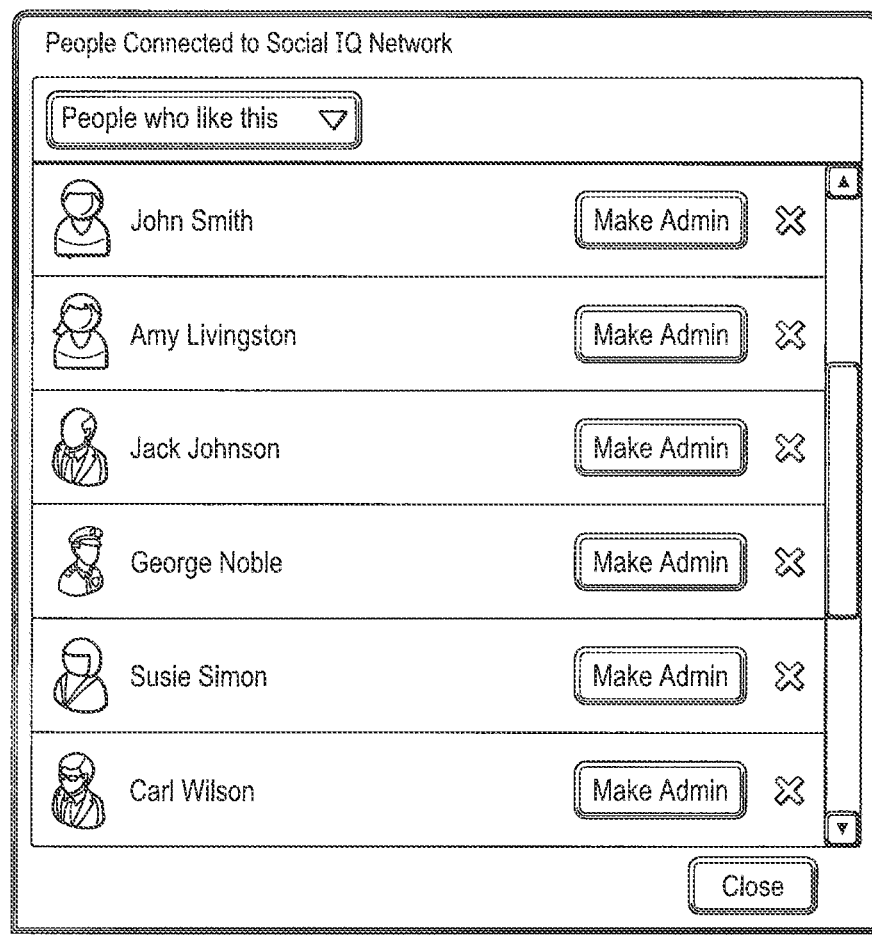
FIG. 1 illustrates a problem associated with prior art social account access controls.
Figure 2:
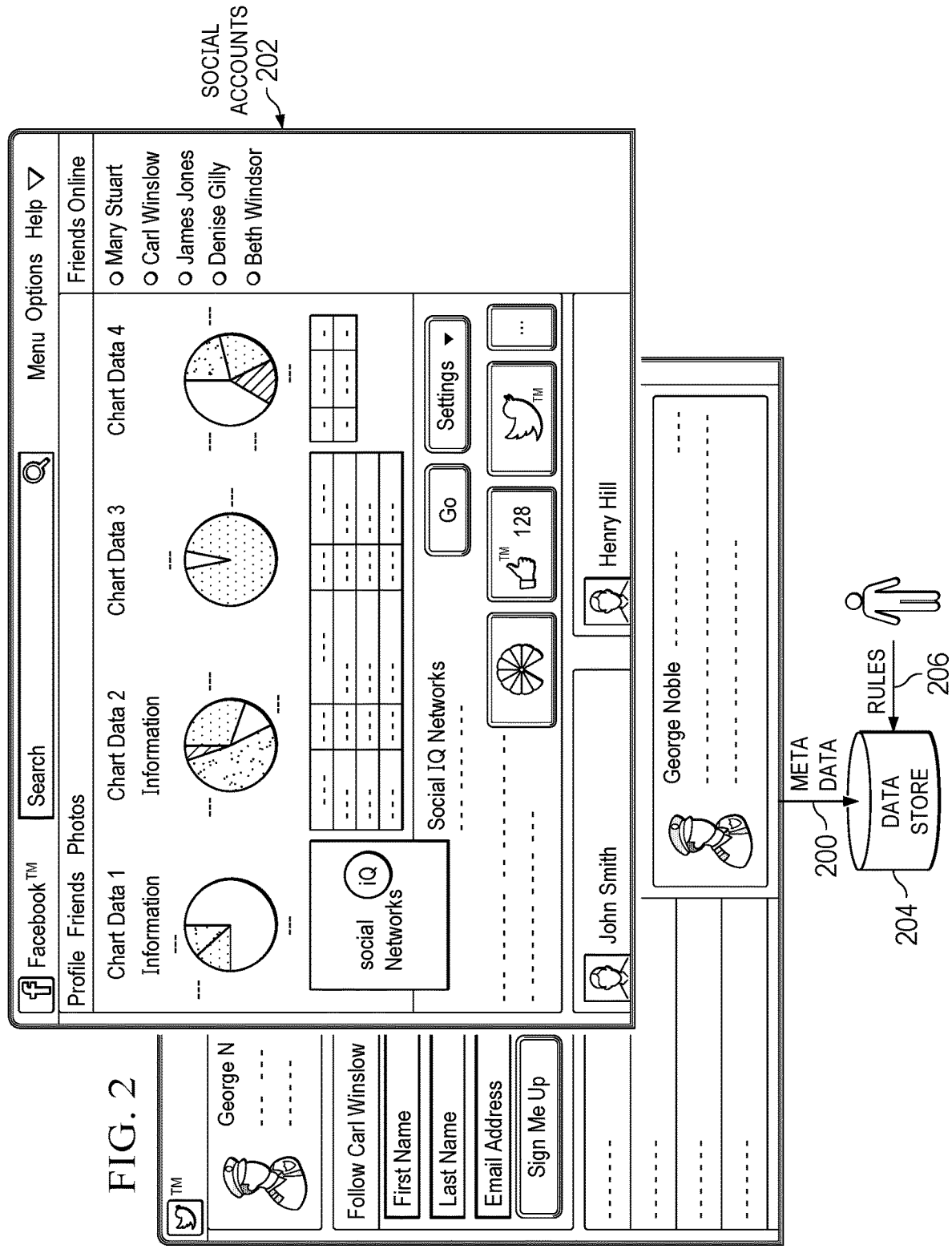
FIG. 2 illustrates the construction of a normative base line for a social account in accordance with an embodiment of the invention.

FIG. 2 illustrates a process of obtaining metadata 200 from a social account 202. The metadata is maintained in a data store 204. Rules 206 governing authorized and unauthorized social account changes are also maintained in the data store 204.

Figure 3:
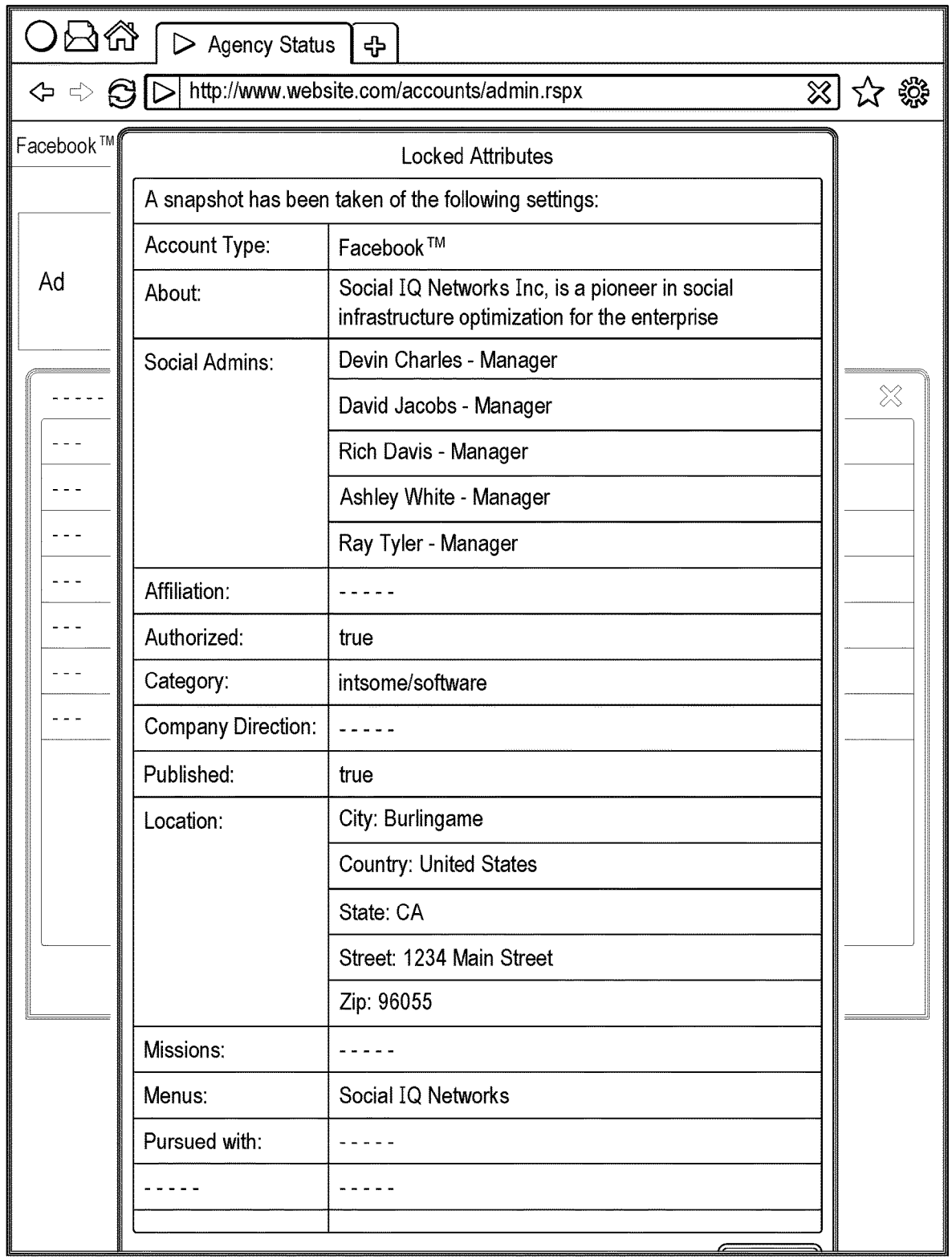
FIG. 3 illustrates metadata collected in accordance with an embodiment of the invention.

The social account is then "locked" to that data set specified in the data store 204. In one embodiment, the data set includes at least one of:

(1) a "snapshot" of the metadata of the social account at a particular point in time. FIG. 3 provides an example of metadata that may be collected in accordance with an embodiment of the invention. In this embodiment, metadata is gathered by calling the application programming interfaces (APIs) of the social network platform with an authorization (an OAuth token) provided by an administrative user of the social account. This metadata includes, but is not limited to, account settings, profile images, configuration information, list of users with administrative rights, lists of detailed permissions each of those users has, addresses, URLs, display names and identifiers;

(2) configuration and rules provided by users, including, but not limited to, times of day and days of week or month that changes may be made, types of content that are allowed or disallowed, types or content or data elements that must or must not exist in published content, locations from which changes may or may not be made, third party applications that may or may not be used to make changes;

(3) rules, regular expressions, machine learning algorithms and data, and heuristics either built offline via generic training sets or online via training sets built from the content and meta data of the social account itself, specifically, machine learning training sets that use aspects of the previous pattern of content posted to the social account, including, but not limited to: the words used in each post, the time of day posts are made, the social applications used to publish the content, and the geographic location that the content was posted from (all of which is queried by the invention through the APIs of the social networking platform), and (4) data pulled from data stores owned by the company that owns the social account, including Lightweight Directory Access Protocol (LDAP) user directories.

Figure 4:
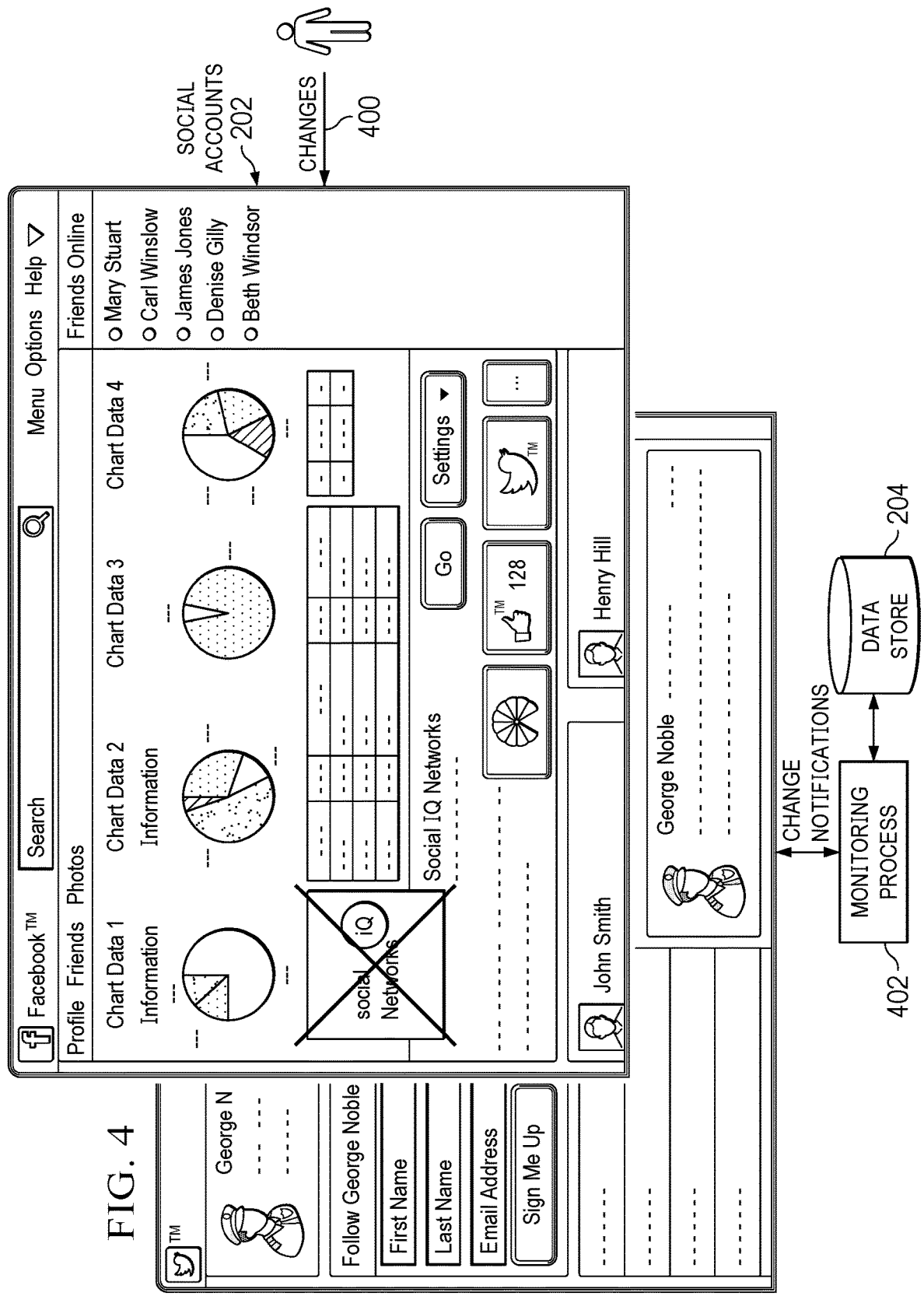
FIG. 4 illustrates a monitoring processing utilized in accordance with an embodiment of the invention.

As described in the Summary, in the Abstract, and below with reference to FIG. 8, the invention uses the data set described above (including a snapshot of metadata of the social account, as exemplified in FIG. 3, gathered by calling the API(s) of the social network platform, account entity data, and predefined rules) to define a normative base line for the social account on the social network platform and uses the normative base line in a process (e.g., 402, 800) or set of processes that are monitoring the social account for identifying changes to the social account (801), as shown in FIGS. 4 and 8. In particular, FIG. 4 illustrates user changes 400 applied to a social account 202. A monitoring process 402 (or 800 of FIG. 8) identifies the changes (803) and accesses the data store 204 to evaluate their propriety. In particular, the monitoring process 402 or 800 compares changes to an account to the normative base line to identify deviations from the normative base line (805).

Figure 5:
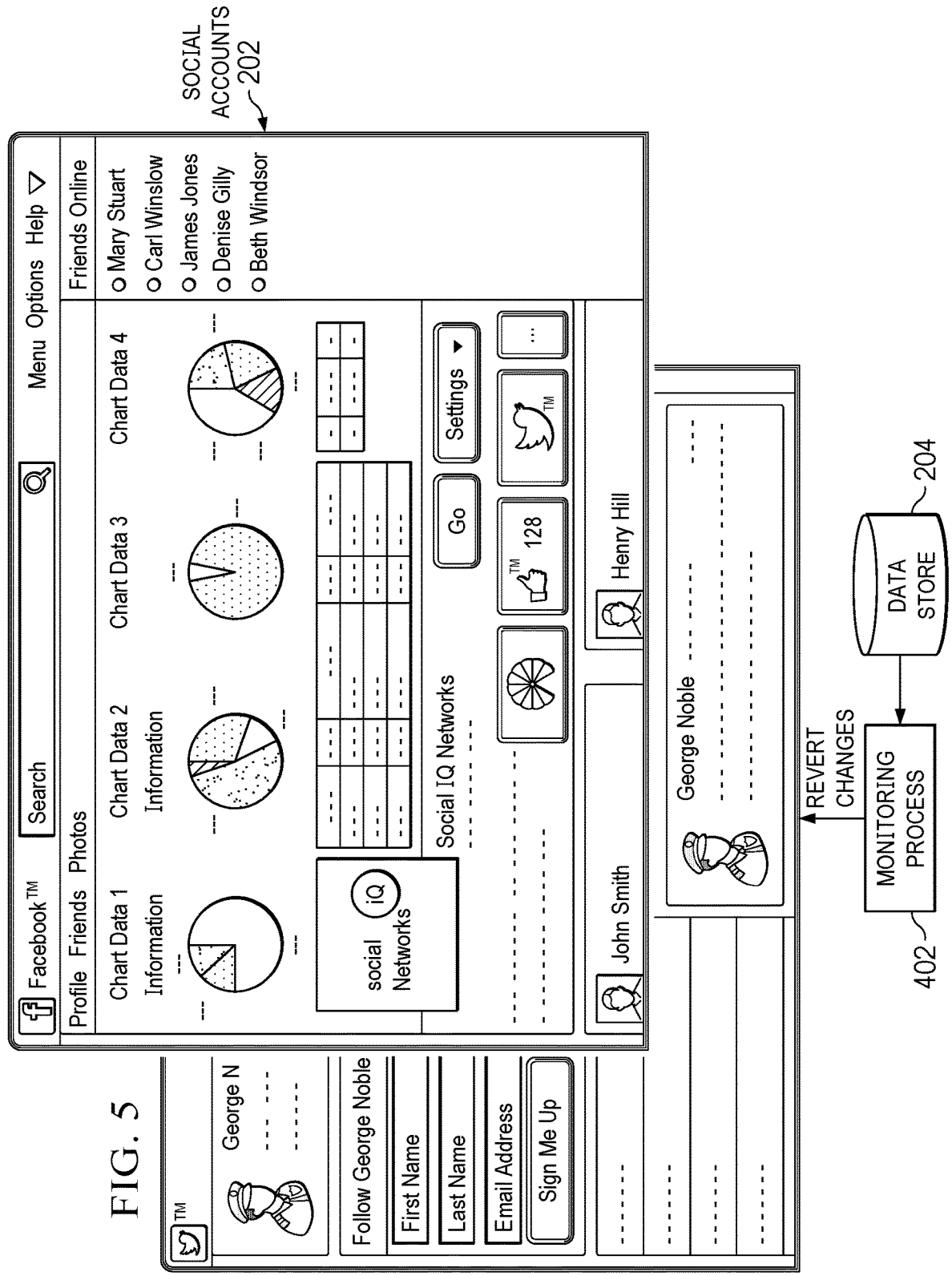
FIG. 5 illustrates content reversion employed in accordance with an embodiment of the invention.

In one embodiment, the invention monitors the social account 202 by calling the social networking platform's programmatic APIs to query the social account metadata and content on a periodic basis (801). When a change is detected (803, 805), the process uses the data set described above, or a separate process that abstracts access to the data set, to determine whether or not the change is authorized (807). If the change is not authorized, the change event is logged and notifications are created within the system and sent via electronic communications (e.g., email, text message, instant message, message on a social account, etc.) to administrators configured within the system (809). The administrators have the option to approve the change or not approve the change. If the change is not approved (811), the system will attempt to put back the original authorized setting or remove the unauthorized content (813). If the change is approved (811), the invention may update the "locked" data set accordingly to ensure that subsequent changes of the same type are considered authorized (815). If configured to do so, the invention may revert the effects of an unauthorized change by updating the social account to restore changed settings or remove unauthorized content in addition to notifying administrators (813), as depicted in FIGS. 5 and 8.

Figure 6:
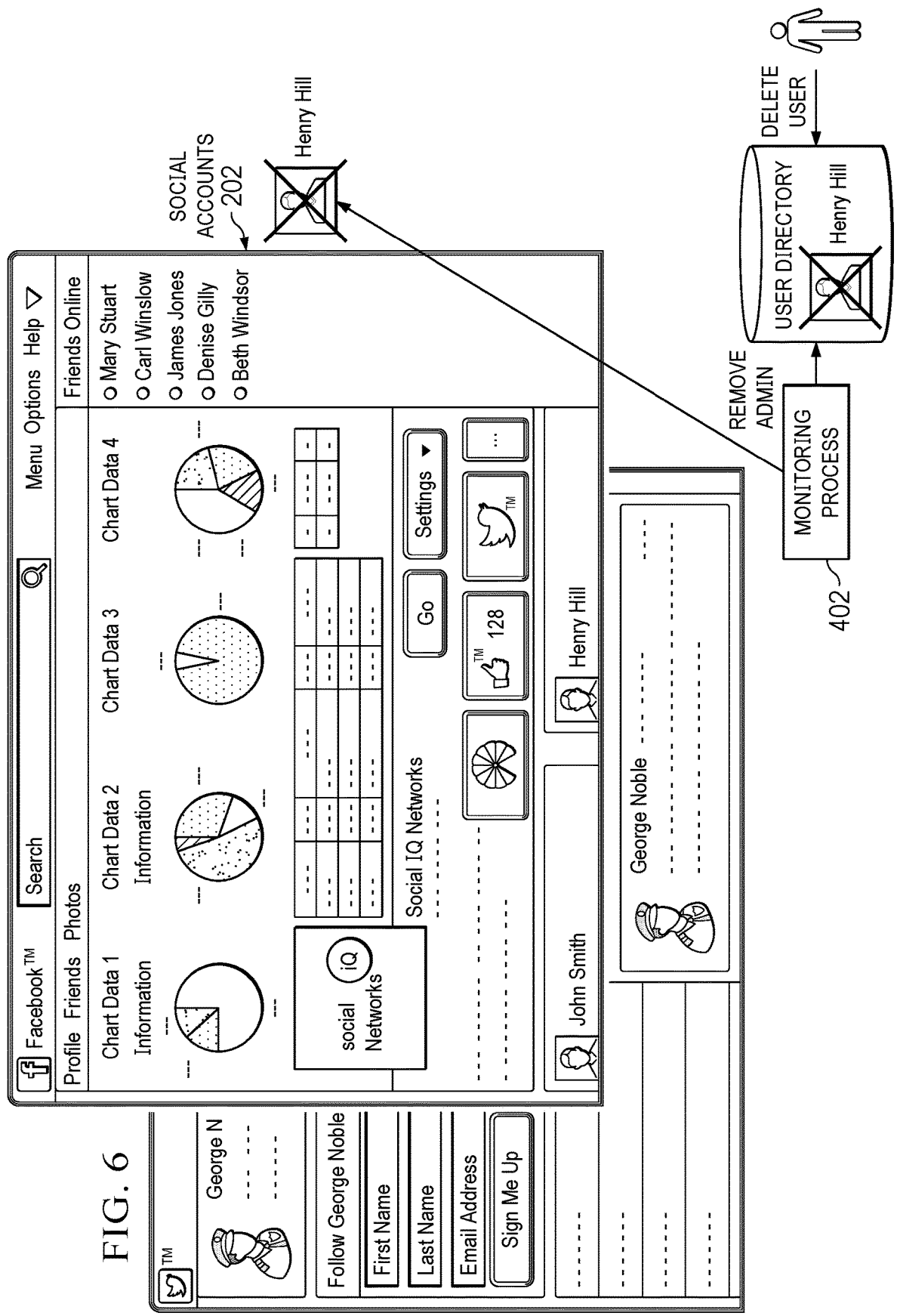
FIG. 6 illustrates administrator authorization changes employed in accordance with an embodiment of the invention.

The invention also periodically checks the list of administrative users of the social account and cross references that list against a set of user identities stored in an LDAP user directory owned and maintained by the company that owns the social account. If an administrator has been added that is not among the authorized set of users in the LDAP directory, the invention will remove that administrator or notify other administrators. If a user has been removed from the directory, the invention will remove that user's administrator credentials from the social account and notify other administrators, as shown in FIG. 6.

The invention may also implicitly update the "locked" data set when an authorized user modifies the social account through a means that is implicitly trusted by the system, such as publishing content via the system itself.

Figure 7:
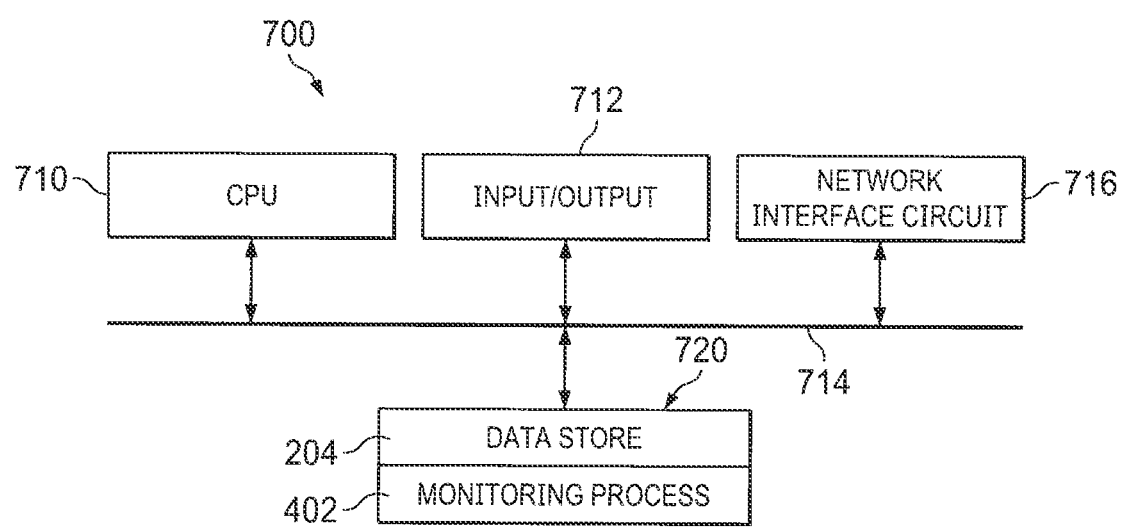
FIG. 7 illustrates a computer configured in accordance with an embodiment of the invention.

FIG. 7 illustrates a computer 700 configured in accordance with an embodiment of the invention. The computer 700 includes a central processing unit 710 that communicates with a set of input/output devices 712 over a bus 714. The input/output devices 712 may include a keyboard, mouse, display and the like. A network Interface circuit 716 is also connected to the bus 714. Thus, the computer 700 can operate in a networked environment, for example, to interface with various users and social networks.

A memory 720 is also connected to the bus 714. The memory 720 stores the previously described data store 204 and monitoring process 402. The invention may be implemented on one or many computers. It is the operations of the invention that are significant, not the particular mechanism for implementing those operations.

There are examples of social account tampering that the invention will act upon. For example, on Oct. 3, 2012, an administrator for KitchenAid's social account on Twitter posted an inappropriate Tweet about Barack Obama. The invention would have detected that the content of this Tweet was dissimilar from the content of previous Tweets, and would have removed the Tweet and notified the other social account administrators.

On Aug. 5, 2012, a pro-Syria group hacked a Reuter's social account on Twitter, changed the screen name and then made pro-Syria posts. The invention would have detected the screen name had changed from the screen name set as part of the social account "snapshot", then would have notified the social account owners, restored the screen name, and removed subsequent Tweets.

On Feb. 27, 2011, the blogger for Digital Inspiration had his social account on Facebook hacked. The hacker changed the password to lock out the legitimate owner. The invention would have detected that the password had been changed on the account, would have notified the account owner and removed any subsequent posts and comments.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A computer implemented method, comprising:
    building, by a computer, a data set that defines a normative base line for a social media account on a social network, the data set containing:
        a snapshot of metadata of the social media account at a point in time,
        a machine learning algorithm trained via a training set that uses aspects of a pattern of content previously posted to the social media account on the social network,
        account entity data pulled from a data store owned by an entity that owns the social media account on the social network, and
        rules governing authorized and unauthorized changes to the social media account, the rules including a rule identifying a content type or data element that is not allowed for the social media account,
        wherein the building includes making a call to an application programming interface (API) of the social network to obtain the content previously posted to the social media account on the social network;
    monitoring, by the computer, the social media account, the monitoring utilizing the normative base line defined by the computer and comprising querying the social network for at least the metadata of the social media account on a periodic basis and comparing the metadata of the social media account queried from the social network with the snapshot of metadata of the social media account at the point in time as defined in the normative base line;
    detecting, by the computer based at least on the metadata of the social media account from the social network, a change to the social media account;
    determining, by the computer, whether the change to the social media account is authorized, the determining comprising:
        comparing the change to the social media account to the normative base line defined by the data set, the comparing including applying the rules to the change to the social media account; and
        identify whether the change represents a deviation from the normative base line, the identifying including determining, based on the rule contained in the data set, whether the change includes unauthorized content of the content type or includes the data element that is not allowed for the social media account;
    in response to a determination by the computer that the change to the social media account is not authorized based on an identification of the deviation from the normative base line, removing unauthorized content from the social media account;
    requesting approval of the change by generating and sending a notification through an electronic communication to at least one system administrator; and
    responsive to the change to the social media account not being approved by the at least one system administrator, reverting the social media account back to an original authorized setting in the normative base line.

2. The computer implemented method of claim 1, wherein the metadata gathered through the API call includes at least one of account settings, profile images, configuration information, a list of users with administrative rights, a list of detailed permissions for each user in the list of users, addresses, URLs, display names, or identifiers.

3. The computer implemented method of claim 1, wherein the account entity data includes Lightweight Directory Access Protocol (LDAP) user directories.

4. The computer implemented method of claim 1, wherein the electronic communication comprises email, text message, instant message, or message on the social media account.

5. The computer implemented method of claim 1, wherein the data set further includes machine learning algorithms and data including machine learning training sets that were prepared using aspects of previous patterns of content posted to the social media account.

6. The computer implemented method of claim 1, further comprising:
    responsive to the change to the social media account being approved by the at least one system administrator, updating the normative base line with the change to the social media account to authorize subsequent changes to the social media account, the subsequent changes having same type as the change to the social media account.

7. The computer implemented method of claim 1, wherein the snapshot of the metadata of the social media account includes a list of administrative users of the social media account, the method further including the steps of:
    monitoring changes to the list of administrative users of the social media account on the social network;
    comparing the list of administrative users of the social media account on the social network to a list of permissible administrative users in the normative base line; and
    removing any administrative users of the social media account on the social network that are not included in the list of permissible administrative users in the normative base line.

8. The computer implemented method of claim 1, wherein the social media account is accessible by a group of subscribers.

9. A computer program product having a non-transitory computer-readable medium storing instructions translatable by a processor for:
building a data set that defines a normative base line for a social media account on a social network, the data set containing:
a snapshot of metadata of the social media account at a point in time,
a machine learning algorithm trained via a training set that uses aspects of a pattern of content previously posted to the social media account on the social network,
account entity data pulled from a data store owned by an entity that owns the social media account on the social network, and
rules governing authorized and unauthorized changes to the social media account, the rules including a rule identifying a content type or data element that is not allowed for the social media account,
wherein the building includes making a call to an application programming interface (API) of the social network to obtain the content previously posted to the social media account on the social network;
monitoring the social media account, the monitoring utilizing the normative base line defined by the computer and comprising querying the social network for at least the metadata of the social media account on a periodic basis and comparing the metadata of the social media account queried from the social network with the snapshot of metadata of the social media account at the point in time as defined in the normative base line;
detecting, based at least on the metadata of the social media account from the social network, a change to the social media account;
determining whether the change to the social media account is authorized, the determining comprising:
comparing the change to the social media account to the normative base line defined by the data set, the comparing including applying the rules to the change to the social media account; and
identify whether the change represents a deviation from the normative base line, the identifying including determining, based on the rule contained in the data set, whether the change includes unauthorized content of the content type or includes the data element that is not allowed for the social media account;
in response to a determination that the change to the social media account is not authorized based on an identification of the deviation from the normative base line, removing unauthorized content from the social media account;
requesting approval of the change by generating and sending a notification through an electronic communication to at least one system administrator; and
responsive to the change to the social media account not being approved by the at least one system administrator, reverting the social media account back to an original authorized setting in the normative base line.

10. The computer program product of claim 9, wherein the metadata gathered through the API call includes at least one of account settings, profile images, configuration information, a list of users with administrative rights, a list of detailed permissions for each user in the list of users, addresses, URLs, display names, or identifiers.

11. The computer program product of claim 9, wherein the account entity data includes Lightweight Directory Access Protocol (LDAP) user directories.

12. The computer program product of claim 9, wherein the instructions are further translatable by the processor for:
responsive to the change to the social media account being approved by the at least one system administrator, updating the normative base line with the change to the social media account to authorize subsequent changes to the social media account, the subsequent changes having same type as the change to the social media account.

13. A system, comprising:
a processor;
a non-transitory computer-readable medium; and
stored instructions translatable by the processor for:
building a data set that defines a normative base line for a social media account on a social network the data set containing:
a snapshot of metadata of the social media account at a point in time,
a machine learning algorithm trained via a training set that uses aspects of a pattern of content previously posted to the social media account on the social network,
account entity data pulled from a data store owned by an entity that owns the social media account on the social network, and
rules governing authorized and unauthorized changes to the social media account, the rules including a rule identifying a content type or data element that is not allowed for the social media account,
wherein the building includes making a call to an application programming interface (API) of the social network to obtain the content previously posted to the social media account on the social network;
monitoring the social media account, the monitoring utilizing the normative base line defined by the computer and comprising querying the social network for at least the metadata of the social media account on a periodic basis and comparing the metadata of the social media account queried from the social network with the snapshot of metadata of the social media account at the point in time as defined in the normative base line;
detecting, based at least on the metadata of the social media account from the social network, a change to the social media account;
determining whether the change to the social media account is authorized, the determining comprising:
comparing the change to the social media account to the normative base line defined by the data set, the comparing including applying the rules to the change to the social media account; and
identify whether the change represents a deviation from the normative base line, the identifying including determining, based on the rule contained in the data set, whether the change includes unauthorized content of the content type or includes the data element that is not allowed for the social media account;
in response to a determination that the change to the social media account is not authorized based on an identification of the deviation from the normative base line, removing unauthorized content from the social media account;

requesting approval of the change by generating and sending a notification through an electronic communication to at least one system administrator; and responsive to the change to the social media account not being approved by the at least one system administrator, reverting the social media account back to an original authorized setting in the normative base line.

14. The system of claim 13, wherein the metadata gathered through the API call includes at least one of account settings, profile images, configuration information, a list of users with administrative rights, a list of detailed permissions for each user in the list of users, addresses, URLs, display names, or identifiers.

15. The system of claim 13, the account entity data includes Lightweight Directory Access Protocol (LDAP) user directories.

16. The system of claim 13, wherein the electronic communication comprises email, text message, instant message, or message on the social media account.

17. The system of claim 13, wherein the data set further includes machine learning algorithms and data including machine learning training sets that were prepared using aspects of previous patterns of content posted to the social media account.

18. The system of claim 13, wherein the stored instructions are further translatable by the processor for:

responsive to the change to the social media account being approved by the at least one system administrator, updating the normative base line with the change to the social media account to authorize subsequent changes to the social media account, the subsequent changes having same type as the change to the social media account.

19. The system of claim 13, wherein the snapshot of the metadata of the social media account includes a list of administrative users of the social media account and wherein the stored instructions are further translatable by the processor for:

monitoring changes to the list of administrative users of the social media account on the social network;

comparing the list of administrative users of the social media account on the social network to a list of permissible administrative users in the normative base line; and removing any administrative users of the social media account on the social network that are not included in the list of permissible administrative users in the normative base line.

20. The system of claim 13, wherein the social media account is accessible by a group of subscribers.

* * * * *